United States Patent
Zheng

(10) Patent No.: US 11,319,647 B2
(45) Date of Patent: May 3, 2022

(54) ANTI-BACTERIAL AND ANTI-ULTRAVIOLET MULTIFUNCTIONAL CHEMICAL FIBER

(71) Applicants: NANTONG TEXTILE & SILK INDUSTRIAL TECHNOLOGY RESEARCH INSTITUTE, Nantong (CN); SOOCHOW UNIVERSITY, Suzhou (CN)

(72) Inventor: Min Zheng, Suzhou (CN)

(73) Assignees: NANTONG TEXTILE & SILK INDUSTRIAL TECHNOLOGY RESEARCH INSTITUTE, Nantong (CN); SOOCHOW UNIVERSITY, Suzhou (CN)

(*) Notice: Subject to any disclaimer, the term of this patent is extended or adjusted under 35 U.S.C. 154(b) by 228 days.

(21) Appl. No.: 16/647,398

(22) PCT Filed: Jun. 27, 2018

(86) PCT No.: PCT/CN2018/093197
§ 371 (c)(1),
(2) Date: Mar. 13, 2020

(87) PCT Pub. No.: WO2019/144567
PCT Pub. Date: Aug. 1, 2019

(65) Prior Publication Data
US 2020/0216982 A1 Jul. 9, 2020

(30) Foreign Application Priority Data

Jan. 29, 2018 (CN) .......................... 201810084187.6
Apr. 17, 2018 (CN) .......................... 201810344876.6

(51) Int. Cl.
*C08F 2/44* (2006.01)
*C08F 2/46* (2006.01)
*C08F 210/02* (2006.01)
*C08F 210/06* (2006.01)
*C08F 214/06* (2006.01)
*C08F 220/54* (2006.01)
*C08F 220/70* (2006.01)
*C08F 222/38* (2006.01)
*C08F 236/12* (2006.01)
*C08G 63/183* (2006.01)
(Continued)

(52) U.S. Cl.
CPC .............. *D01F 1/103* (2013.01); *C08K 5/005* (2013.01); *C08K 5/0058* (2013.01); *D01D 5/08* (2013.01); *D01F 1/106* (2013.01); *D01F 6/14* (2013.01); *D01F 6/16* (2013.01); *D01F 6/70* (2013.01); *D01F 6/88* (2013.01); *D01F 6/90* (2013.01); *D01F 6/92* (2013.01); *D01F 6/94* (2013.01); *D01F 6/96* (2013.01); *D01F 9/08* (2013.01); *C08K 2003/3045* (2013.01); *C08K 2003/3063* (2013.01); *C08K 2003/3081* (2013.01)

(58) Field of Classification Search
CPC .. C08F 2/44; C08F 2/46; C08F 210/02; C08F 210/06; C08F 214/06; C08F 220/54; C08F 220/70; C08F 222/38; C08F 236/12; C08G 63/183; C08G 63/85; C08G 63/866; C08G 69/26; C08G 69/28; C08G 69/30; C08J 3/28; C08K 3/014; C08K 3/015; C08K 3/24; C08K 3/28; C08K 2003/3045; C08K 2003/3063; C08K 2003/3081; C08K 5/005; C08K 5/0058; C08K 5/09; C08K 5/101; D01D 5/08; D01F 1/10; D01F 1/103; D01F 1/106; D01F 6/88; D01F 6/90; D01F 6/92; D01F 6/94
USPC ......... 264/144, 211, 331.13, 331.15, 331.17, 264/331.19, 331.21; 523/122, 351; 524/174, 175, 176, 423, 502, 503, 538, 524/539, 555, 570, 571, 781, 783, 803, 524/812, 815, 834; 525/416, 418, 420
See application file for complete search history.

(56) References Cited

U.S. PATENT DOCUMENTS

2004/0091400 A1* 5/2004 Wada ..................... G01N 30/00
422/400
2011/0049939 A1* 3/2011 Ryu ......................... D01F 1/10
296/214

FOREIGN PATENT DOCUMENTS

CN 101134815 A 3/2008
CN 101993527 A 3/2011
(Continued)

OTHER PUBLICATIONS

Translation of CN 106835341 A (published on Jun. 13, 2017).*

*Primary Examiner* — Leo B Tentoni
(74) *Attorney, Agent, or Firm* — SZDC Law PC

(57) ABSTRACT

A method for preparing an anti-bacterial and anti-ultraviolet multifunctional chemical fiber includes: dissolving several soluble metal salts and a polymer complexing dispersant into water to prepare an aqueous solution; adding into a polymer monomer; reacting under microwave or hydrothermal action to obtain a polymer monomer containing multifunctional nano oxides; adding the polymer monomer with other monomer, catalyst, initiator, stabilizer, and the like into a polymerization reactor; and carrying out esterification, polycondensation or copolymerization to obtain a polymer melt, and carrying out spinning or ribbon casting and granule cutting to obtain an anti-bacterial and anti-ultraviolet multifunctional chemical fiber or masterbatch chips. By generating nano metal oxides in the monomer in situ before the polymerization reaction, small particle sizes and dispersibility of the nano metal oxide are ensured; the chemical (Continued)

fiber has efficient, durable antibacterial and anti-ultraviolet functions and is free of metal ion precipitation.

2 Claims, 1 Drawing Sheet

(51) Int. Cl.
| | |
|---|---|
| *C08G 63/85* | (2006.01) |
| *C08G 69/26* | (2006.01) |
| *C08G 69/28* | (2006.01) |
| *C08G 69/30* | (2006.01) |
| *C08J 3/28* | (2006.01) |
| *C08K 3/014* | (2018.01) |
| *C08K 3/015* | (2018.01) |
| *C08K 3/24* | (2006.01) |
| *C08K 3/28* | (2006.01) |
| *C08K 5/09* | (2006.01) |
| *C08K 5/101* | (2006.01) |
| *D01F 1/10* | (2006.01) |
| *D01F 6/14* | (2006.01) |
| *D01F 6/16* | (2006.01) |
| *D01F 6/70* | (2006.01) |
| *D01F 6/90* | (2006.01) |
| *D01F 6/96* | (2006.01) |
| *D01F 9/08* | (2006.01) |
| *D01D 5/08* | (2006.01) |
| *D01F 6/94* | (2006.01) |
| *D01F 6/88* | (2006.01) |
| *D01F 6/92* | (2006.01) |
| *C08K 5/00* | (2006.01) |
| *C08K 3/30* | (2006.01) |

(56) References Cited

FOREIGN PATENT DOCUMENTS

| | | | |
|---|---|---|---|
| CN | 102585493 A | | 7/2012 |
| CN | 103789868 A | | 5/2014 |
| CN | 106835341 A | * | 6/2017 ............... D01F 6/92 |
| CN | 108193308 A | | 6/2018 |

* cited by examiner

ANTI-BACTERIAL AND ANTI-ULTRAVIOLET MULTIFUNCTIONAL CHEMICAL FIBER

This application is the National Stage Application of PCT/CN2018/093197, filed on Jun. 27, 2019, which claims priority to Chinese Patent Application Nos.: 201810084187.6, filed on Jan. 29, 2018, and CN 201810344876.6, filed on Apr. 17, 2018, are of which are incorporated by reference for all purposes as if fully set forth herein.

FIELD OF THE INVENTION

The present invention relates to an anti-bacterial and anti-ultraviolet multifunctional chemical fiber obtained by in-situ polymerization, and belongs to the technical field of special textile materials.

BACKGROUND OF THE INVENTION

Chemical fibers have been widely used for their excellent physical and chemical properties. However, with the progress of science and technology and the further improvement of people's living standards, the development and application of functional chemical fiber textiles has become a major direction for the research and development of functional textiles in China. Due to the characteristics of chemical fibers, in order to obtain a long-lasting functional effect, the production method of functional chemical fibers is mainly based on the blended spinning method. For example, Chinese patent CN104963028A provides a preparation method of antibacterial polyester fiber by PET polyester chips through melt spinning antibacterial polyester masterbatch, wherein the antibacterial polyester masterbatch is obtained by melting and extruding the mixture of PET polyester chips, pretreated nano silver antibacterial agent, antioxidants, lubricants and dispersing agents, said pretreated nano silver antibacterial agent is a nano silver antibacterial agent obtained by coating with polyethylene wax. It solves the problem that the nano-silver antibacterial agent with small particle size has a poor distribution in the PET matrix and attains a high-efficient and long-lasting antibacterial polyester fiber through melt-spinning.

Chinese patent CN103184575A provides a method for producing antibacterial nylon, including the following steps: (1) preparing antibacterial nylon masterbatch: blending and granulating nylon 6 chips with nano-silver phosphate to obtain antibacterial nylon masterbatch; (2) spinning: blend spinning the antibacterial nylon and nylon 6 chips prepared in step (1), and then oil winding, balancing and stretching to obtain antibacterial nylon. In this technical solution, due to directly adding nano-silver phosphate to the nylon, the physical properties of the nylon are degraded, which will reduce the service life of the product.

There are also reports in the literature that pre-prepared nanomaterials are directly dispersed into polymer monomers and then mixed with other polymer monomers for polymerization. For example, Chinese patent CN102345179A discloses a method for preparing nanometer zinc oxide modified polyester fibers, metal oxide such as zinc oxide is directly dispersed in a polymer monomer, and Chinese patent CN105962510A uses a method of adding a nano-mineral modifier to the polymerization area of a polymer monomer to obtain a nano-mineral energy fiber. In the above methods, the nano material is not easy to be uniformly dispersed in the polymer monomer, and the particle size of the oxide used is greater than 20 nm, which affects the performance and causes blocking of the spinner. U.S. Pat. No. 9,527,918B2 discloses a method that firstly dissolves some zinc-containing salts in polymer monomers and then polymerizes with other monomers and spins. The disadvantage is that the antibacterial properties of the product still depend on the precipitation of zinc ions, the concentration of the precipitation of zinc ions is controlled at a lower point, but it does not solve the problem fundamentally. In addition, these products only have a single function of antibacterial instead of multifunctions.

SUMMARY OF THE INVENTION

In order to overcome the shortcomings of the existing functional chemical fiber technologies, the present invention provides an anti-bacterial and anti-ultraviolet multifunctional chemical fiber obtained by in-situ polymerization. It has high-efficiency and long-lasting anti-bacterial and anti-ultraviolet multi-function, no metal ion precipitation, and it is safe and environmentally friendly to use.

The technical solution for achieving the purpose of the present invention is to provide an anti-bacterial and anti-ultraviolet multifunctional chemical fiber, which is prepared according to the following steps:

(1) dissolving soluble metal salts and a polymer complex dispersant into water at a mass ratio of 1:0.02 to 0.5 to prepare an aqueous solution having the soluble metal salts concentration of 5 to 10%; adding the aqueous solution into a polymer monomer under vigorous stirring, the molar concentration of the soluble metal salts in the polymer monomer is 0.01 to 0.5M, and the reaction is carried out under microwave or hydrothermal condition at a temperature of 130 to 180° C. for 30 to 50 minutes, and evaporating under vacuum to control the water content below 2% to obtain a polymer monomer containing nano-oxides; the soluble metal salts are a mixture of two or more compounds selected from of zinc, magnesium, calcium, titanium, copper, aluminum, zirconium, barium, strontium, and silicon; the polymer complex dispersant is selected from polyacrylamide, polyacrylic acid, polyvinylpyrrolidone, polyvinyl alcohol, polymaleic anhydride, polyquaternary ammonium salt, polyethylene glycol, polyurethane, polyamide, and amino acid; the polymer monomer is selected from ethanol, acetone, ethylene glycol, propylene glycol, butanediol, glycerol, allyl alcohol, ethylene diamine, caprolactam, and amino acid;

(2) at the beginning or intermediate stage of the polymerization reaction, adding the polymer monomer containing nano-oxides obtained in step (1) to conventional polymer monomer and other monomers required for polymerization, and mixing thoroughly, carrying out the polymerization reaction under common polymerization condition to prepare anti-bacterial and anti-ultraviolet multifunctional polymer melt;

(3) spinning the polymer melt prepared in step (2) to obtain an anti-bacterial and anti-ultraviolet multifunctional chemical fiber; or ribbon casting and granule cutting the polymer melt to obtain anti-bacterial and anti-ultraviolet multifunctional masterbatch chips.

In the present invention, said conventional polymer monomer is selected from PET, PBT, PTT, PA, ABS, PP, PE, PVC, and PU.

The present invention uses one of the monomers used in chemical fiber polymerization as a medium, and directly synthesizes nano-oxides smaller than 5 nm in situ in the medium to get a monomer containing multi-functional nano-oxide. The polymer undergoes a polymerization reaction with other conventional monomer to obtain a highly efficient and multifunctional chemical fiber or masterbatch.

The anti-bacterial and anti-ultraviolet multifunctional chemical fiber obtained by the invention not only has the advantages of a simple process, high efficiency, energy saving and environmental protection, but also has a high-efficiency and durable antibacterial and anti-ultraviolet multifunctional, no metal ion precipitation, safe and environmentally friendly use, and effectively overcomes the problem of discoloration caused by silver ions currently commonly used, and other problems such as single function. The nano metal oxide is generated in situ in the monomer before the polymerization reaction, which ensures the small particle size and dispersion of the nano metal oxide, and does not affect subsequent spinning and weaving. At the same time, the semiconductor catalysis of the nano metal oxide accelerates the polymerization speed of monomers, which can save one third of time and save energy compared with the conventional one.

Compared with traditional functional chemical fibers, the nano-oxide is synthesized in situ in the monomer in advance, with a small particle size and good dispersibility, which does not affect subsequent spinning and weaving. At the same time, it has excellent functions without metal ion precipitation, which is very safe and environmentally friendly. Compared with traditional chemical fiber synthesis, the use of the catalytic effect of nano metal oxides greatly shortens the polymerization time, improves the efficiency, and saves energy.

Because the nano-oxide is synthesized in situ in the polymer monomer, the particle size is small, and the dispersion is good. It does not affect the subsequent spinning and weaving. At the same time, it has excellent functions and no metal ions, which is very safe and environmentally friendly. Compared with traditional chemical fiber synthesis, the use of the catalytic effect of nano metal oxides greatly shortens the polymerization time, improves the efficiency, and saves energy.

Compared with the prior arts, this invention has outstanding advantages as following:

1. Using one of the monomers used in chemical fiber polymerization as a medium, nano-oxides with a particle size of less than 5 nm can be synthesized directly in situ, without re-dispersion, and have good compatibility with other polymerization monomers.

2. With the catalytic effect of nano metal oxides, it greatly shortens the polymerization time, improves the efficiency and saves energy;

3. The anti-bacterial and anti-ultraviolet multifunctional fiber provided by the present invention has a strong and durable anti-bacterial and anti-ultraviolet function, and has no metal ion precipitation, and is safe and environmentally friendly to use.

DETAILED DESCRIPTION OF THE INVENTION

The technical solution of this invention will be further described below with the accompanying figures and examples.

Embodiment 1

Titanium sulfate, zinc acetate, and polyethylene glycol are dissolved in water at a mass ratio of 0.5:0.5:0.1 to prepare a 6% aqueous solution; the aqueous solution is gradually added to 5000 ml of ethylene glycol under vigorous stirring, and then placed in a microwave oven. The reaction is carried out at a temperature of 150° C. for 40 minutes, and cooled to obtain a nanometer metal oxide-containing ethylene glycol monomer having a particle size of 5 nm or less; and then the water therein is evaporated under vacuum until the water content is less than 2%; the ethylene glycol monomer containing nano metal oxide and terephthalic acid with molar ratio of 1.2:1 are added to the esterification polymerization reactor, and then in mass percentage, 0.05% catalyst antimony trioxide ($Sb_2O_3$) and 0.02% stabilizer triethyl phosphate (TEPA) are added and carry out esterification reaction for 1 h under the conditions of autoclave pressure of 2.0 MPa and temperature of 200° C.; turn on the vacuum system, raise the temperature to 270° C. to start polycondensation reaction for 2.5 h; after the reaction, the product is spun, cooled and shaped to obtain a polyester fiber with anti-bacterial and anti-ultraviolet function.

Figure 1:
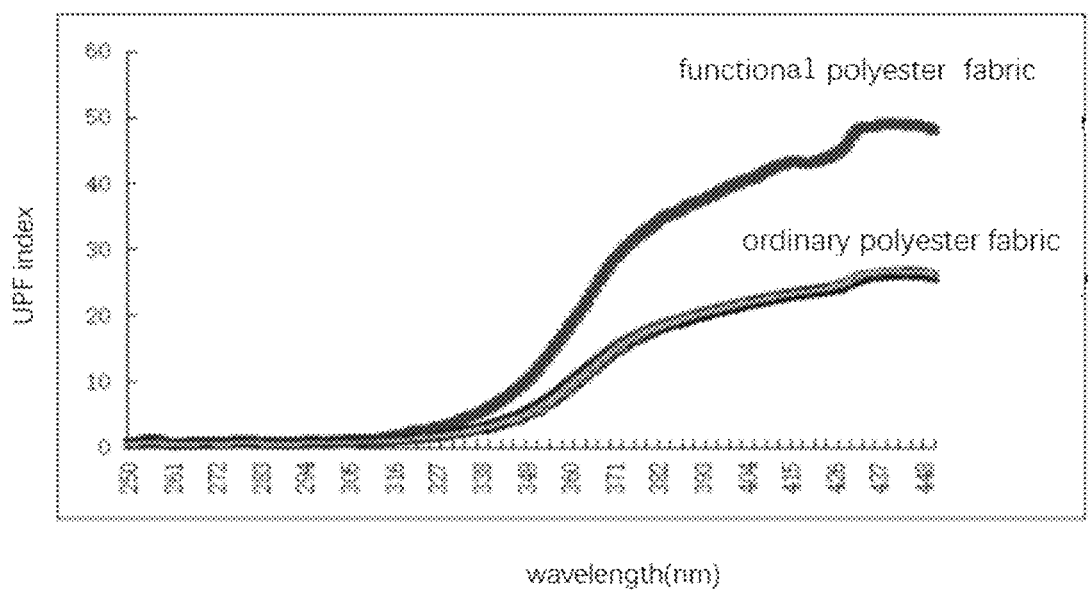
FIG. 1 is a UV protection effect diagram of the nanometer anti-bacterial and anti-ultraviolet multifunctional polyester fiber provided in embodiment 1 of the present invention.

Referring to FIG. 1, it is a comparison diagram of the UV protection effect of the functional polyester fabric provided in this embodiment and ordinary polyester products. As can be seen from the curve in the figure, the UV protection index of the nano anti-bacterial and anti-ultraviolet multifunctional polyester provided by this embodiment is obviously higher than that of ordinary polyester.

Figure 2:
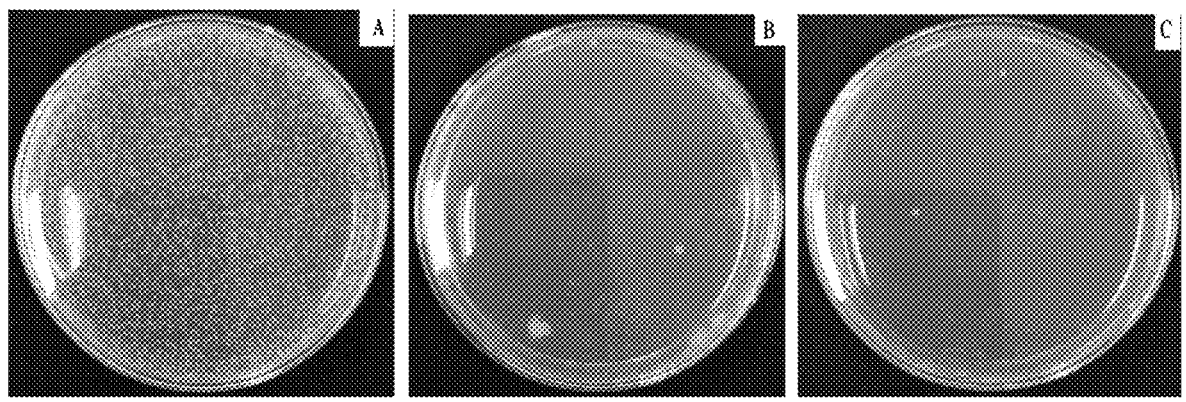
FIG. 2 is an anti-bacterial effect diagram of the nanometer anti-bacterial and anti-ultraviolet multifunctional polyester fiber provided in embodiment 1 of the present invention.

Referring to FIG. 2, it is a comparison diagram of the anti-bacterial effect of the nano anti-bacterial and anti-ultraviolet multifunctional polyester fiber provided by the embodiment and ordinary polyester; wherein, A is ordinary polyester, and B is the anti-bacterial and anti-ultraviolet multifunctional polyester fiber of this embodiment, C shows the anti-bacterial and anti-ultraviolet multifunctional polyester after 50 times of washing.

Embodiment 2

Copper acetate, zinc acetate, titanium sulfate, and polyvinylpyrrolidone are dissolved in water at a mass ratio of 0.4:0.3:0.3:0.2 to prepare a 7% aqueous solution; the aqueous solution is gradually added to 5000 ml of 1,3 propylene glycol under vigorous stirring; the solution is put in a microwave oven and the reaction is carried out at 170° C. for 30 minutes, and cool to obtain 1,3 propylene glycol monomers containing nano metal oxides with particle sizes below 5 nm; evaporate the water under vacuum until the water content is below 2%. 1,3 propylene glycol monomer containing nano metal oxide and dimethyl terephthalate with molar ratio 1.5:1, 0.05% catalyst tetrabutyl titanate, 0.03% stabilizer triethyl phosphate are added to the reactor, under the protection of nitrogen, the esterification is carried out at an autoclave pressure of 0.1 MPa and 210° C. for 1 h; then it is sent to a polycondensation reactor, and under high vacuum, the temperature is raised to 250° C. to start polycondensation, and the reaction time is 4.5 h; after the reaction, the product is spun, cooled and granule cut to obtain anti-bacterial and anti-ultraviolet PTT chemical fiber masterbatch.

Embodiment 3

Titanium sulfate, zinc nitrate, zirconyl oxychloride, and polyethylene glycol are dissolved in water at a mass ratio of 0.3:0.4:0.3:0.5 to prepare a 6% aqueous solution; the aqueous solution is gradually added to 5000 ml of adipic acid under vigorous stirring. The solution is put into a hydrothermal reaction kettle, react at 160° C. for 40 minutes, cool to obtain adipic acid monomer containing nano metal oxides with particle sizes below 5 nm; caprolactam monomer and a small amount of water, cobalt acetate, and nylon monomer salt are added to the reaction kettle, and the reaction is carried out under a nitrogen atmosphere at a pressure of 2.0 MPa and a temperature of 235° C. for 4 hours. Then, adipic acid monomer containing nano metal oxide is added in, and the reaction is continued for 2 hours. Add soft segment polyethylene glycol and catalyst tetrabutyl titanate, heat to 247° C., and continue to react for 2 hours to obtain an anti-bacterial and anti-ultraviolet PA6 melt. After the reaction, the product is spun, cooled, and sliced to obtain an anti-bacterial and anti-ultraviolet and far infrared PA6 nylon masterbatch.

I claim:

1. A preparation method of anti-bacterial and anti-ultraviolet multifunctional chemical fiber, characterizing in comprising the following steps:
   (1) dissolving soluble metal salts and a polymer complex dispersant into water at a mass ratio of 1:0.02 to 0.5 to prepare an aqueous solution having the soluble metal salts concentration of 5 to 10%; adding the aqueous solution into a polymer monomer under vigorous stirring, the molar concentration of the soluble metal salts in the polymer monomer is 0.01 to 0.5M, and the reaction is carried out under microwave or hydrothermal condition at a temperature of 130 to 180° C. for 30 to 50 minutes, and evaporating under vacuum to control the water content below 2% to obtain a polymer monomer containing nano-oxides; the soluble metal salts are a mixture of two or more compounds selected from of zinc, magnesium, calcium, titanium, copper, aluminum, zirconium, barium, strontium, and silicon; the polymer complex dispersant is selected from polyacrylamide, polyacrylic acid, polyvinylpyrrolidone, polyvinyl alcohol, polymaleic anhydride, polyquaternary ammonium salt, polyethylene glycol, polyurethane, polyamide, and amino acid; the polymer monomer is selected from ethanol, acetone, ethylene glycol, propylene glycol, butanediol, glycerol, allyl alcohol, ethylene diamine, caprolactam, and amino acid;
   (2) at the beginning or intermediate stage of the polymerization reaction, adding the polymer monomer containing nano-oxides obtained in step (1) to conventional polymer monomer and other monomers required for polymerization, and mixing thoroughly, carrying out the polymerization reaction under common polymerization condition to prepare anti-bacterial and anti-ultraviolet multifunctional polymer melt;
   (3) spinning the polymer melt prepared in step (2) to obtain an anti-bacterial and anti-ultraviolet multifunctional chemical fiber; or ribbon casting and granule cutting the polymer melt to obtain anti-bacterial and anti-ultraviolet multifunctional masterbatch chips.

2. The preparation method of anti-bacterial and anti-ultraviolet multifunctional chemical fiber according to claim 1, wherein in the step (2), said conventional polymer monomer is selected from PET, PBT, PTT, PA, ABS, PP, PE, PVC, and PU.

* * * * *